UNITED STATES PATENT OFFICE.

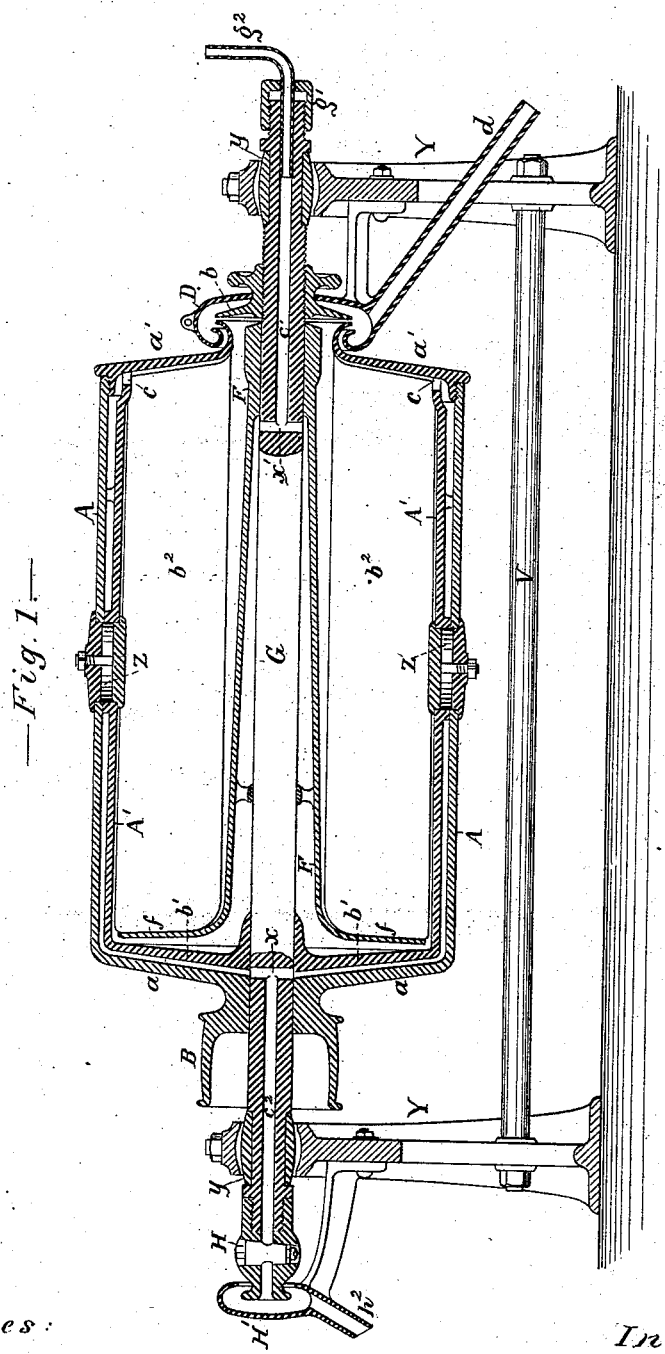

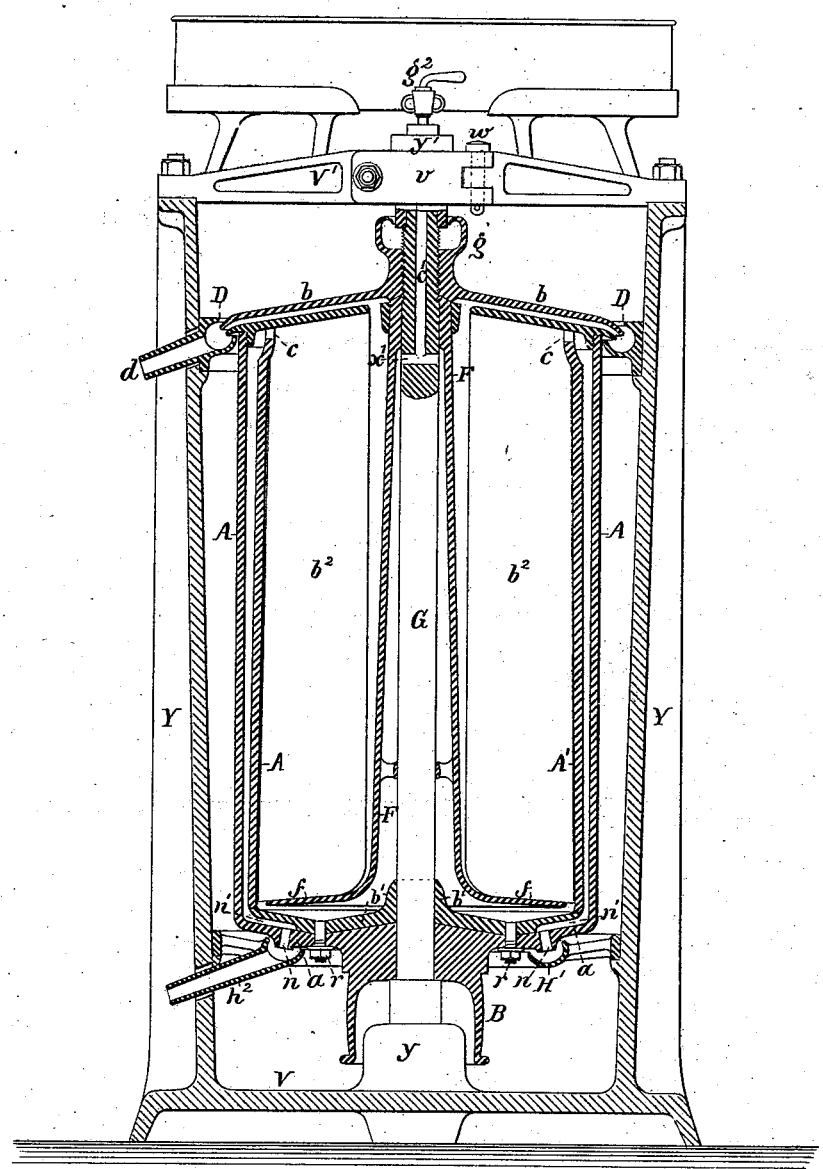

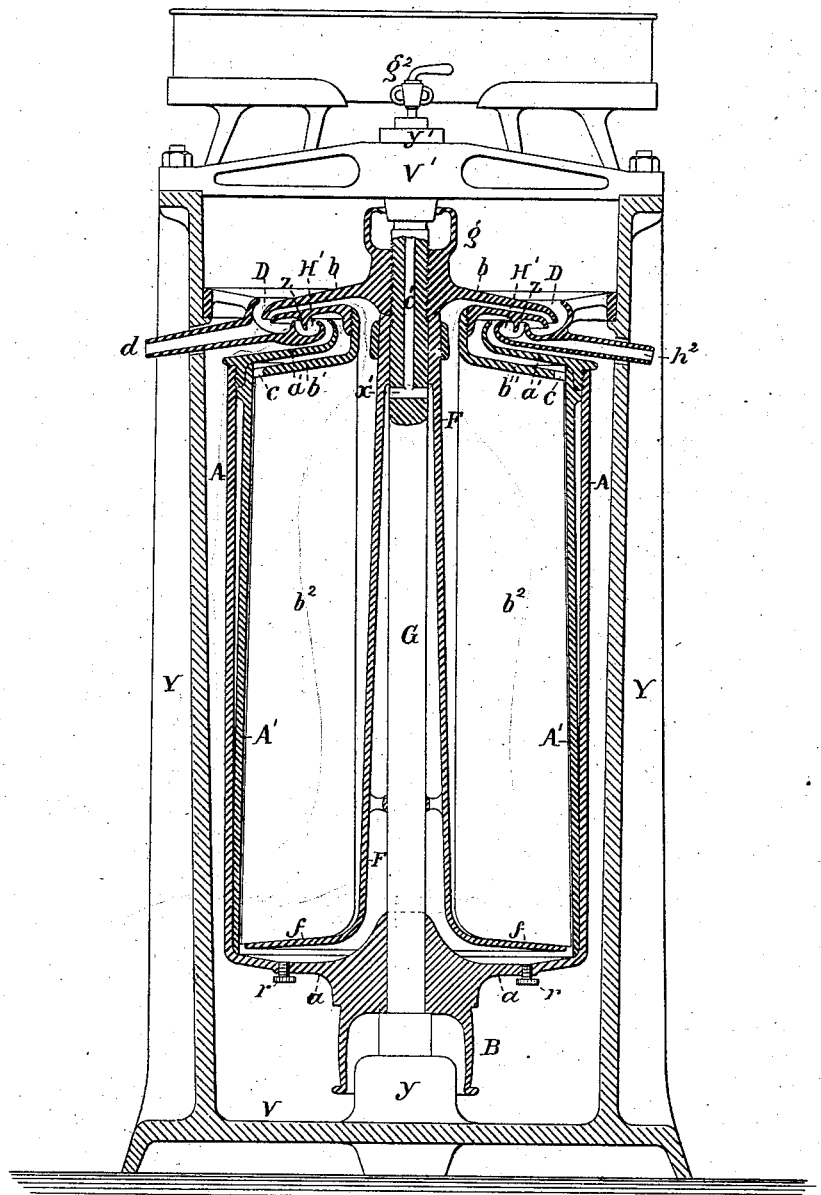

WILHELM C. L. LEFELDT AND CARL G. O. LENTSCH, OF SCHÖNINGEN, BRUNSWICK, GERMANY, ASSIGNORS TO THEODORE BERGNER, PHILADELPHIA, PENNSYLVANIA.

CENTRIFUGAL CREAMER.

SPECIFICATION forming part of Letters Patent No. 292,662, dated January 29, 1884.

Application filed July 23, 1879. Patented in France January 7, 1879, No. 128,351, and in Germany January 28, 1879, No. 9,241.

*To all whom it may concern:*

Be it known that we, WILHELM C. L. LEFELDT and CARL G. O. LENTSCH, both of Schöningen, in the Duchy of Brunswick and Empire of Germany, have jointly invented certain new and useful improvements in the process of creaming milk and in apparatus for the conduct of such process, of which improvements the following is a specification.

Our present invention is primarily derived from the process of creaming milk by centrifugal force, and from the apparatus for the conduct of such process described in Letters Patent of the United States No. 195,515, and will be found substantially comprised in the German Letters Patent No. 9,241, granted to us under date of January 28, 1879, and French Patent No. 128,351, dated January 7, 1879.

The process described in our aforesaid Patent No. 195,515 consists, essentially, in effecting the separation of the milk and the cream into vertical belts by centrifugal action, and maintaining their separation by allowing the revolving vessel to subside from its maximum velocity to a state of rest without jerk or shock so slowly or gradually that as the centrifugal force decreases the law of gravitation supervenes, and the vertical belts of milk and cream subside into distinct horizontal strata conformably with their respective specific gravities, the cream being skimmed off by hand after the machine has come to a state of rest, and the skimmed milk being subsequently removed from the machine to be replaced with a new charge of fresh milk. We have advanced this process of creaming milk by centrifugal force so far as not only to separate the milk from the cream by centrifugal action, but also to remove the cream from the centrifugal machine mechanically and during the rotation of the vessel, so that after the cream has been skimmed off the vessel is brought to a state of rest, only to remove the skimmed milk and to be charged again with fresh milk, and upon this advance we have based a separate application for a patent distinct from this application.

The improvements described in each of the above instances include adaptations of the apparatus to the respective processes. So far in the skimming and creaming process, while the cream was skimmed off mechanically during the rotation of the vessel, yet with this mechanical skimming the process was completed, because the feed-supply, which forced off the cream, consisted entirely of skimmed milk; and, therefore, when this feed-supply had forced off the cream it only remained to remove the body of skimmed milk from the vessel to recharge it with fresh milk, and repeat the creaming and skimming operation. To remove this body of skimmed milk in that process, after the cream was skimmed off mechanically the vessel was brought to a state of rest and emptied, as described in our said further application. The intervals between the completion and the repetition of these operations and the emptying and recharging of the vessel were not inconsiderable, and we soon realized that even in this creaming and skimming process much of the operative capacity of the machine was not utilized as far as it might be made available—as, for example, when it is observed that the skimmed milk fed in to remove the cream mechanically does not in any other way contribute to the product, while in performing this function it does consume time and power and protracts the operation, as already mentioned. These facts acquired significance in our own practice by reason of the large scale on which we were conducting the centrifugal creaming operation, and it became an object of solicitude with us to take the one further step which seemed possible to complete this mechanical creaming and skimming system; and in this behalf it became the object, as it is the result, of our present further improvements to adapt the apparatus and process to a continuous effective operation on the largest scale, in order that while creaming the milk mechanically, as in our said Patent No. 195,515, and creaming and skimming it mechanically, as in our said further application, we effect the skimming by feeding in fresh milk instead of skimmed milk, and without interrupting this feed-supply remove not only the cream but the skimmed milk mechanically while the machine continues in operation, so that we can now maintain a continuous supply of fresh milk to the centrifugal machine while maintained at its highest speed of rotation and a continuous withdrawal of the cream and skimmed milk separately as fast as their separation is completed, and thus have at the same time in the machine four operations continuously going on—that is, first, the supply to the machine of a continuous feed of fresh milk; second, the separation of the milk into cream and skimmed milk, with a further separation from both of all impurities; third, the mechanical skimming off of the cream and its removal from the rotating vessel; and, fourth, the mechanical removal of the milk from the rotating vessel, these removals of the cream and of the milk being effected without disturbance of their completed separation from each other and without interfering with the incipient and progressive stages of the separation in the body of milk supplied; and by this system the operation of the machine may remain uninterrupted until the sheer accumulation of impurities on the side of the vessel renders it expedient to stop the machine and empty it, in order to wash it out or otherwise clean it.

In the accompanying drawings we have shown our improved apparatus in the best forms known to us, and we proceed to describe our continuous process as conducted in this apparatus, showing and describing also certain modifications of the apparatus and of the process which we contemplate using, as circumstances may dictate.

Figure 1 is a longitudinal central section through an improved continuous creaming apparatus, the vessel rotating on a horizontal axis, and the cream being skimmed off at one end while the skimmed milk is removed at the opposite end, the fresh milk being supplied through the axis at the same end at which the cream is removed, and this we deem the best system. Fig. 2 is a similar section of a modification in which the same process is adapted to a machine substantially the same, except that it rotates on a vertical axis, the fresh milk being supplied and the cream removed at the top while the skimmed milk is removed at the bottom of the vessel; and Fig. 3 is a similar section of another modification of substantially the same apparatus, in which the vessel rotates on a vertical axis, and the fresh milk is supplied and the cream skimmed off and the skimmed milk removed at the top of the vessel.

In Fig. 1 the vessel A is secured on its shaft G, which rotates in bearings $y$ $y$ on the uprights Y Y, mounted on a bed-plate or on the floor, and held together by the cross-girts V. The vessel A is made of metal, and of suitable strength to meet the requirements of a centrifugal machine. It is a cylinder closed at one end by the head $a$, on which is mounted the driving-pulley B, secured to the shaft G, on which shaft this end of the vessel A is made fast. The shaft is bored out from its adjacent end through this head, and has a cross-hole, $x$, opening on the inside of the cylinder. The opposite end of the vessel also has a head, $a'$; but this head has a central opening in it through which the shaft projects, and in which is the small end of the coned sleeve F, surrounding the shaft and secured thereto, as presently to be described, an annular space being left between the end of this coned sleeve and the opening in the head $a'$. Upon the projecting end of the shaft is the adjustable cap $b$, fitting down upon the opening in the head $a'$ of the cylinder. Within the cylinder is the drum A'. This drum is a smaller cylinder concentric with the cylinder A, and having a head, $b'$, while the other end of the drum is open upon the head $a'$ of the cylinder A. The drum A' is permanently secured to the cylinder A and to the shaft G, so as to leave a space between the head $b'$ of the drum and the head $a$ of the cylinder A, and also having an annular space between the drum and the cylinder, from the head $a$ to the head $a'$. Within the drum the coned sleeve F surrounds the shaft, from the opening in the head $a'$ of the cylinder to within a short distance of the head $b'$ of the drum, so as to leave around the shaft a conical annular space between it and the coned sleeve, while a small space is also left between the head $b'$ of the drum and the flared bottom $f$ of the coned sleeve, and also a small space between the edge of the flared bottom of the coned sleeve and the wall of the drum.

In the shaft G, near the head $a'$ of the cylinder, and within the coned sleeve, is a cross-hole, $x'$, communicating with a channel $c'$, extending through the shaft from this point to its outer end. The drum has radial partitions $b^2$, extending from its side toward the coned sleeve, as far as the circumference of the opening in the end $a'$ of the cylinder; and it will be observed that a space is still left between the coned sleeve and the inner edges of these partitions, along their entire length, and also openings are left between the ends of these partitions and the end $a'$ of the cylinder. It is not essential, however, that there should be end openings between the partitions $b^2$ and the head $a'$ of the cylinder, nor is it essential that the partitions should extend entirely to the side of the drum, as the centrifugal action is not affected by the presence or absence of such spaces so long as the radial partitions impel the body of the charge, which is their only essential function. A series of holes, $c$, afford communication between the interior of the drum and the annular and end spaces between the drum and the cylinder, thus establishing communications through the shaft G and the drum from one end of the cylinder to the other, as will be more fully understood by now recapitulating as follows: The channel through the shaft G, communicating through the cross-hole $x'$, opens into the coned sleeve F, from which there are open passages beneath and around the flared bottom of the coned sleeve into the drum $A'$, and from this drum the openings $c$ communicate at the opposite ends of the drum with the annular and end spaces between the drum and the cylinder, as already mentioned, and from the end space between the head $a$ of the cylinder and the head $b'$ of the drum communication continues through the cross-hole $x$ out through the channel in that end of the shaft.

Around the adjustable screw-cap $b$, which covers the opening in the end $a'$ of the cylinder, we fit an annular chamber, D, from the bottom of which an outlet-pipe, $d$, leads off the cream to any suitable receptacle. The channel $c'$ in the shaft G has a cap, $g'$, which revolves with the shaft, and through this cap a stationary inlet-pipe, $g^2$, connects with the supply of fresh milk. On the opposite end of the shaft a regulating-cock, H, is fitted, so as to allow the opening or closing of communication through the channel $c^2$ with the chamber $H'$, from which an outlet-pipe, $h^2$, leads off the skimmed milk to any suitable receptacle.

The operation of the above-described apparatus is as follows: The inlet-pipe $g^2$ being connected with a feed-supply of fresh milk, and the feed-supply being regulated by a cock, and the outlet through the cock H being also adjusted, power is applied from any suitable motor to the driving-pulley B. It is immaterial whether the vessel be charged or partially charged before it is started or during its rotation and before it attains its maximum speed; but the proper practice is to so regulate the supply that when the vessel attains its maximum speed of rotation the charge will be of the proper volume, and at that point the feed should be stopped for fifteen or twenty minutes, or while the first separation of the cream is effected. The condition of the charge at this point will be as described in our previous specification—that is, the impurities will have been thrown against the wall of the drum $A'$, the cream will have been thrown toward the center of the drum, and the skimmed milk will have been formed in a belt between the cream and the wall of the drum, these separations forming distinct annular belts about the horizontal axis of the vessel instead of vertical belts, as where the vessel rotates on a vertical axis. The charge being now ready for the skimming stage of the process, and the rotation of the vessel being maintained at its maximum velocity, the feed-supply is opened under such regulation as to admit the fresh milk in the proper quantity through the channel $c'$ into the coned sleeve F, and from thence out beneath and around the flared bottom $f$ of the coned sleeve into the belt of skimmed milk next the wall of the drum, this supply being acted upon in its course by the centrifugal force, so that when it reaches the belt of milk it has already been incipiently creamed and its constituents—to wit, the fatty particles and the serum or blue milk, are therefore very rapidly distributed, respectively, to the belts of cream and milk, the accretion to the volume of the belt of milk being of course much greater than the contribution to the belt of cream. The belt of cream is correspondingly contracted about the axis of the vessel, and moved out past the edges of the partition $b^2$ until it escapes around the coned sleeve, through the opening in the head $a'$ of the cylinder A, and flies out under the screw-cap $b$ into the annular chamber D, from which it runs off through the pipe $d$ to the receptacle. Meanwhile the volume of skimmed milk, confined as it is to the space within that occupied by the cream as it is displaced by accretion, does not reach the central opening in the head $a'$, but passes off through the holes $c$, around the end $a'$ of the vessel, (the number of these holes being adapted to the volume of the required discharge,) into the annular space between the drum and the cylinder, and thence into the end space between the head $a$ of the cylinder and the head $b'$ of the drum, whence it escapes through the cross-hole $x$ into the channel $c^2$, and out through the cock H into the chamber $H'$, from which the pipe $h^2$ leads it off into the receptacle.

The operation above described is very perfect and uniform, subject only to the due regulation of the supply and the discharge, as to which regulation no specific rule can be prescribed, but which must be left to the judgment of the operator, who will require but very little experience in or observation of the working of the process to determine when he is feeding too fast or too slow, and when the milk is being discharged before it is thoroughly creamed; and, in fact, the laws under which the process is effected are so uniform that it is merely a question of care whether the products are more or less perfectly separated; and it will be found that the specific gravities of the constituents of the charge under the action of the centrifugal force, when not counteracted by undue rapidity of feed, not only force the cream to the center and retain the skimmed milk outside of it, but keep the accretions to the volume of the skimmed milk suspended, as it were, within the belt of skimmed milk until the separation from it of all the particles of cream is effected, so that, while these particles go toward the center, the heavier particles go in the opposite direction, and there is no tendency either in the cream to go to the wall or in the skimmed milk to go to the center, so that cream alone escapes into the chamber D and skimmed milk alone escapes through the openings $c$; and these incipient and progressive separations are effected, as above described, without any such disturbance of the belt of cream as would impair its complete segregation.

It will thus be seen that we have now described and shown our perfected system of continuously creaming and skimming milk mechanically; and it only remains to add that the process may be practiced without interruption until the accumulation of impurities upon the wall of the drum renders it expedient to remove them, to do which the machine must be stopped and any charge remaining therein removed, when steam or hot water may be introduced and the vessel scoured. The removal of the charge and the introduction of steam or hot water, and the removal of impurities we provide for without necessarily dismounting the machine by openings Z Z, made through the cylinder A and the drum A', and closed by removable covers, these being placed opposite each other, as shown, so as not to disturb the balance of the vessel while rotating. When indications are found that the vessel is in a foul condition, and it is proposed to stop the machine, it is only necessary, in order to do this without any loss of cream, to shut off the supply of fresh milk and to feed instead thereof a sufficient quantity of skimmed milk to complete the skimming of the charge in the vessel, so that when the vessel is stopped it will contain only the residuum of skimmed milk to be drawn off through the hand-hole Z.

In Fig. 2 we have shown a modification of the apparatus above described, in which our continuous system is conducted upon substantially the same principle, but in a vessel rotating upon a vertical axis, the cream being skimmed off at the top and the skimmed milk being drawn off at the bottom. In this case the revolving cylinder A is supported on a shaft, G, in the frame Y, with a step, $y$, for the lower end of the shaft in the base-plate V and a bearing, $y'$, for the upper end of the shaft in the cross-girt V'.

To facilitate the dismounting of the machine when necessary, we fit over this bearing in the cross-girt a hinged cover, $v$, which is secured by a bolt, $w$. The driving-pulley B is secured to the shaft G and to the bottom $a$ of the cylinder.

In the general details of construction and arrangement of parts the cylinder and drum are made as already described, being, substantially the machine shown in Fig. 1 set up on end. It has the channel $c'$ and the cross-hole $x'$, through which the fresh milk is admitted under the regulated feed $g^2$, to the interior of the coned sleeve F, and thence underneath and around the flared bottom $f$ of the coned sleeve into the drum A'. It also has the radial partitions $b^2$, the annular opening around the upper end of the coned sleeve for the escape of the cream, and the openings $c$ $c$ in the wall of the drum, through which the skimmed milk escapes into the annular space between the drum and the cylinder. An annular trough, H', is supported on the frame underneath the cylinder, to receive the skimmed milk as it escapes therefrom, and a pipe, $h^2$, leads it off to the receptacle. An annular trough, D, is supported in the frame at the upper end of the cylinder, to receive the cream as it escapes therefrom, and a pipe, $d$, leads it off to the receptacle. The adjustable screw-cap $b$ is simply modified by extending its rim so as to cover the surface of the upper end of the cylinder, between which and the rim the escaping cream is confined and conducted into the trough D.

We have shown a cup, $g$, on the shaft, the object of which is to catch any drip of the lubricator from the bearing $y'$, which might otherwise find its way into the machine.

We also modify the construction of the bottom plate, $a$, of the cylinder by substituting for the cross-hole $x$ and channel $c^2$ in Fig. 1 a series of vertical holes, $n$ $n$, through the bottom and we leave the bottom $b'$ of the drum free to be turned on the shaft, by loosening the screw-bolts $r$ $r$, which clamp it to the cylinder, and for which movement we provide slotted openings in the bottom $a$ of the cylinder. A series of radial channels, $n'$, in the bottom $b'$ of the drum coincide with the openings $n$ $n$ in the bottom of the cylinder, and to regulate the discharge of the skimmed milk it is only necessary to loosen the bolts and move them in their slots, thereby turning the bottom of the drum so that the edges of the radial channels in the bottom $b'$ will more or less close the openings $n$ $n$. Since the drum is connected with the cylinder, and they revolve together, and it is therefore desirable to steady their connection, we make the bottom $b'$ a properly-fitted separate plate, so that the above-described adjustment can be made without turning the drum itself.

The operation is exactly as described with reference to Fig. 1, the belts of cream and milk only being vertical instead of horizontal.

In Fig. 3 we have shown another modification of our continuous system in a machine revolving on a vertical axis, but discharging both the cream and the skimmed milk at the top of the vessel. This machine, like that shown in Fig. 2, is supported in a frame, Y, on the shaft G, and driven by the pulley B. We here reverse the ends of the drum A', making the plate $b'$ the top of the drum, while the drum opens at the bottom upon the plate $a$ of the cylinder. The cream and the milk both being discharged at the same end in this case, no annular space is required between the cylinder and the drum. The channel $c'$ and cross-hole $x$ conduct the regulated supply from the feed $g^2$ into the coned sleeve F, under and around which it escapes into the drum, where it is separated into vertical belts of cream and milk, as already so fully described.

The top of the drum and of the cylinder are adapted to the escape of the milk and cream, respectively, at one and the same end by the following simple modification in their construction: While the annular space around the upper end of the coned sleeve remains as before, and while the cream escapes through this annular space and passes off between the top of the drum and the rim of the adjustable cap $b$ into the trough D, from which it is conducted away by the pipe $d$ to the receptacle, we substitute for the lateral openings $c\ c$, Fig. 2, in the wall of the drum, the vertical openings $c\ c$ in the top $b'$ of the drum, and through these vertical openings the skimmed milk escapes into the space between the top plate, $b'$, of the drum and the top plate, $a'$, of the cylinder, into the annular trough H', within and concentric with the annular trough D. From this trough H' the milk is conducted off through the pipe $h^2$ to the receptacle. These troughs D and H' are supported on the frame, as shown in the drawings, and to prevent the skimmed milk from being thrown into the trough D we have a deflector, $z$, depending from the under side of the discharge-channel, against which deflector the milk is thrown, so that it falls into the trough H'. The details of this arrangement of discharge-channels, troughs, and deflector will be readily understood from the drawings. The screws $r\ r$ in the bottom of the vessel are simply for removal when it is desired to have an opening in the bottom of the vessel for cleaning.

The operation is the same as hereinbefore explained, except only in the above-mentioned particular—that is to say, both the cream and the skimmed milk are drawn off at the same end, instead of at different ends, as in Fig. 2.

Our description of the foregoing process and apparatus has been restricted to their use for creaming and skimming milk; but we have found that our new application of the laws of centrifugal force under these adaptations of mechanism are available for separating other fluids, the constituents of which have, like those of fresh milk, well-defined different specific gravities; and therefore, while we claim herein only the process of creaming and skimming milk mechanically, as described, we do not confine our claims on the mechanism to its use for creaming milk, but claim these improvements, broadly, for whatever purpose they may be used.

In all three of the vessels above described the same rule obtains in this further respect that whenever there is an escape for the skimmed milk either laterally, as in Figs. 1 and 2, or vertically, as in Fig. 3, at the outer edge or through the wall or end of the drum A', the process may be either continuous, as we have described, or it may be intermitted after the cream has been skimmed off by stopping the feed-supply, as already mentioned; and although we have described the process as continuous, and the bringing of the vessel to a state of rest when it is desired to cleanse the apparatus, yet when it is unnecessary to stop the machine for this purpose the machine need not be stopped in order to remove the skimmed milk, because, after the cream has been skimmed off, if the machine is kept in rapid rotation and the supply stopped, the centrifugal force will drive off the remaining contents of the vessel through the openings $c\ c$; and this is what we mean by intermitting the process, to resume which it is only necessary while the machine continues to rotate to charge it afresh. Moreover, it may be sometimes expedient to augment the volume of the charge without contributing to the cream obtained from it, and in such cases skimmed milk, or milk and water, or even water alone, may be fed in for the purpose of driving off the belt of cream. This, however, is only practicable when the process is intermitted, as above described, because if such a supply was continued after the cream was driven off, there would be no practical result, but only a discharge of skimmed milk or milk and water.

Having thus described the nature and objects of our improvements, what we claim herein as new, and desire to secure by Letters Patent, is—

1. The combination of the cylinder A with the drum A', revolving together, substantially as and for the purposes described.

2. The combination of the drum, the cylinder, the channel $c'$, the cross-hole $x'$, and the coned sleeve, substantially as and for the purposes described.

3. The combination of the cylinder A, the drum A', the inlet $c'$, and the outlet $c^2$, substantially as and for the purposes described.

4. The combination of the cylinder A, the drum A', and the screw-cap $b$, substantially as and for the purposes described.

5. The combination of the cylinder, the drum, the screw-cap, the chamber or trough D, and the outlet $c^2$ with the chamber or trough H', substantially as and for the purposes described.

6. The combination of the cylinder, the supply $g^2$, and the discharge H, substantially as and for the purposes described.

7. That improvement in the method or process of creaming milk which consists in separating the cream therefrom by centrifugal action, discharging a portion of the skim-milk while the drum is in rapid rotation, then feeding the drum while in rapid rotation, so that the fresh milk is introduced next the inner wall of the drum into the skim-milk in the drum, and between the drum and the cream-wall previously formed and then established within the drum.

8. That improvement in the art of feeding or introducing milk into a centrifugal machine, to separate the milk from the cream and keep the cream-wall unbroken during the creaming operation, which consists in feeding the milk into the machine next the inner wall of the then revolving drum.

9. A closed centrifugal drum mounted upon a vertical tubular axle, and provided with interior radial flanges, and with a series of peripherical discharge-tubes located above the drum.

10. A closed centrifugal drum mounted upon a vertical tubular axle, and provided with interior radial flanges, and with a discharge-tube concentric with the axle, opening from the upper center of the drum.

11. A closed centrifugal drum provided with a double set of central discharge-pipes adjustable in relation to each other, one of said pipes communicating with the periphery and the other with the center of the drum.

12. A closed centrifugal drum provided with radial interior flanges, and a double set of vertical discharge-tubes, in combination with a central vertical tubular axle, and a distributing-shield attached thereto.

WILHELM C. L. LEFELDT.
CARL G. O. LENTSCH.

Witnesses:
JNO. KRACKE,
BRUNO GAEDE.